July 7, 1925.  
J. H. REICHELT  
COMBINED CULTIVATOR AND DRILL  
Filed March 7, 1922   2 Sheets-Sheet 1
1,544,681
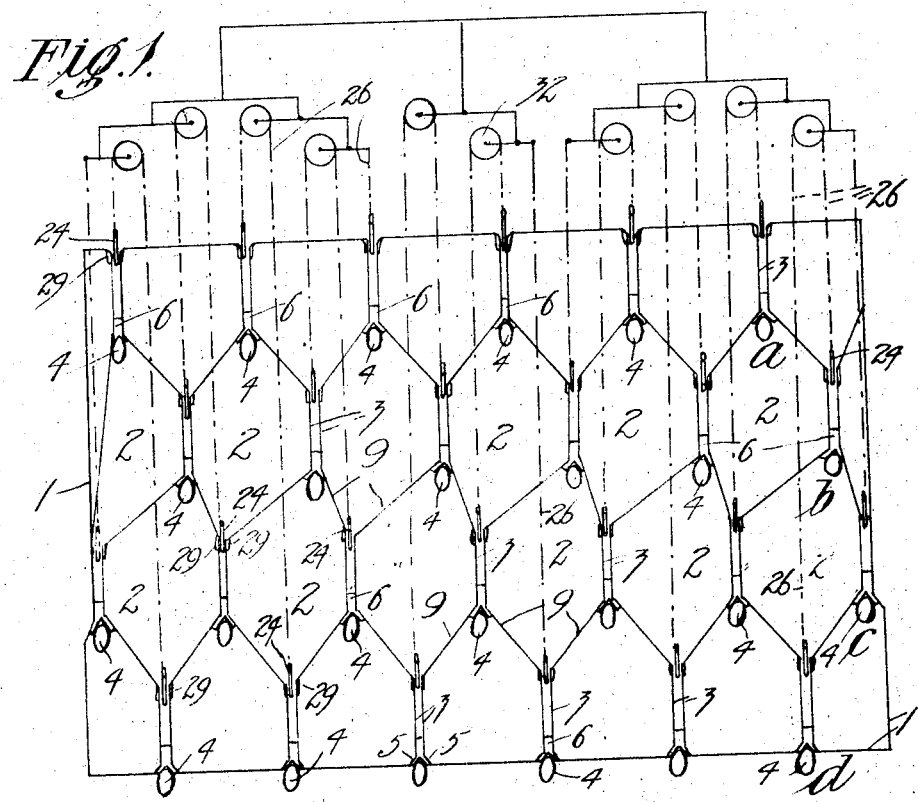
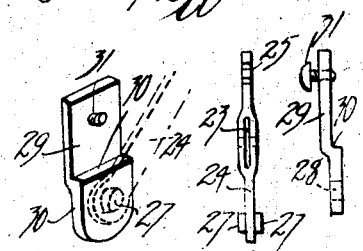
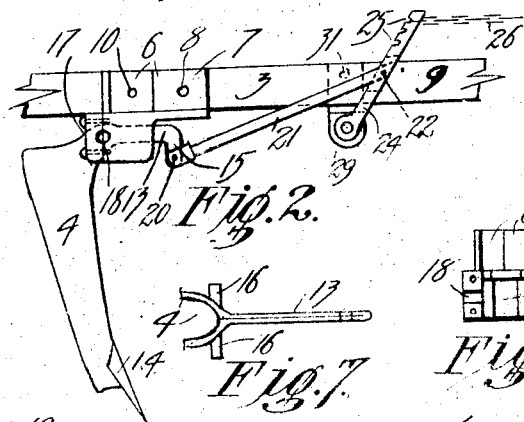
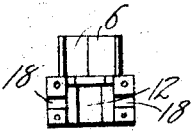
Inventor.  
J. H. Reichelt  
By Lawrence Lange  
Atty Inventor:
J. H. Reichelt
By Lawrence Langnee
Attorney.

Patented July 7, 1925.

1,544,6..

UNITED STATES PATENT OFFICE.

JOHANN HEINRICH REICHELT, OF LORQUON, VIA NHILL, VICTORIA, AUSTRALIA.

COMBINED CULTIVATOR AND DRILL.

Application filed March 7, 1922. Serial No. 541,803.

*To all whom it may concern:*

Be it known that JOHANN HEINRICH REICHELT, a citizen of the Commonwealth of Australia, and resident of Lorquon, via Nhill, in the State of Victoria, Commonwealth of Australia, has invented certain new and useful Improvements in and Relating to Combined Cultivators and Drills, of which the following is a specification.

This invention relates to combined cultivators and seed and fertilizer drills, and has been devised in order to provide mechanism of greater utility than that at present in use.

The invention is specially applicable to implements the stump jump mechanism of which is connected to and operates against the draft of the machine.

The invention is further characterized by the following features:—

1. A float frame suspended below the drill in the formation of a honeycomb the hoes carrying the tines being mounted at the points where the angles of the honeycomb frame meet and the hoes are arranged in a plurality of rows the adjacent parallel side edges of the honeycomb sections being sufficiently wide to allow of stump jump connecting devices to operate therein or pass therethrough.

2. A hoe supporting float frame with the stump jump connecting devices and supported by transverse angle iron beams with or without longitudinal bars in pairs and spaced from each other to provide guide members for the stump jump connections.

The interconnecting mechanism between the hoe and the chains connecting the draft of the machine, which is characterized in that the parts are detachable and renewable and that each draft connection is above the float frame.

In order that the invention may be more readily understood it will now be described with reference to the accompanying drawings in which:—

Figure 1 is a diagrammatic view in plan of one form of float frame and draft connections therefor.

Figure 2 is a view in side elevation of one form of stump jumping connections.

Figure 3 is a view in plan of Figure 2.

Figure 4 is a view in side elevation and Figure 5 is a view in front elevation of the hoe supporting bracket.

Figure 6 are views of the link connecting the draft chains and the bracket supporting said link.

Figure 7 is a view in plan of the extending hoe arm.

Figure 8 is a view in plan of the hoe supporting bracket form in two halves.

Figure 9:
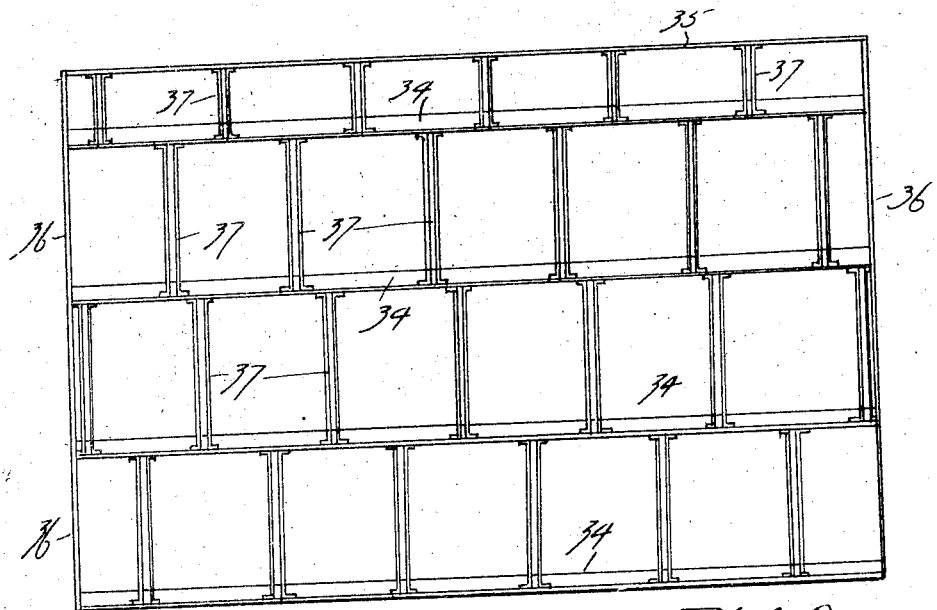
Figure 9 is a view in diagrammatic plan of a modified construction of float frame.
Figures 11, 12, 13:
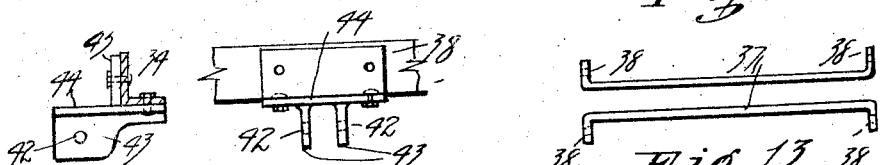
Figures 11 and 12 are views in side elevation and end elevation of a modified construction of the hoe supporting brackets.
Figure 13 is a view in plan of guide bars for the stump jump mechanism.
Figure 10:
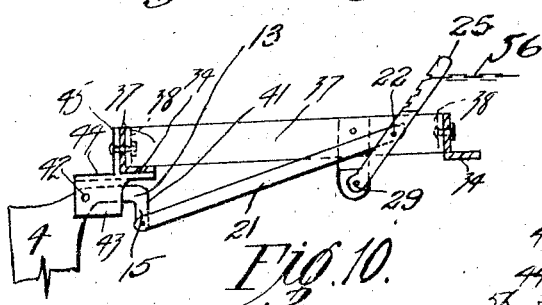
Figure 10 is a view of a modified construction of stump jump connections between the hoe and draft.

According to this invention the usual wheeled main frame and seed and fertilizer drilling mechanism is provided. A single float frame 1 is suspended below the drill box at both ends by any suitable means.

This float frame 1 is of honeycomb construction that is to say, of a plurality of rows of hoe supporting members 2 in honeycomb formation, with the parallel adjacent walls 3 spaced from each other to allow mechanism to operate therebetween.

This honeycomb float frame 1 is preferably disposed so that it will support a plurality of rows of hoes in transverse parallel line but out of horizontal line with each other.

The hoes 4 are supported immediately at the rear of each pair of parallel adjacent side members 3 of the honeycomb sections, that is, where the diagonal ends curve away from each other as at 5 towards the next adjacent parallel surfaces on either side.

The hoes 4 are not mounted in parallel horizontal line, that is, in the line of travel only one end or apex of each honeycomb section is in the centre of the honeycomb the other end or apex being arranged on one side to the front or rear, between the said hoe connection and the next one on that particular side, thus the hoes 4 are mounted in transverse parallel lines *a*, *b*, *c*, *d* but the distance of each furrow apart in horizontal line so that a single hoe forms each furrow.

The hoes 4 are mounted to the float frame 1 by a specially constructed bracket. This bracket at the top where it connects the float frame at the intersections 5 of each honeycomb section 2 is Y shaped as at 6 to conform to the curve, the leg 7 of the Y bracket enters between the parallel sides 3 of the sections 2 and is bolted thereto as at 8 while the diverging arms 6 of the Y portion follow respective diagonal arms 9 of the main frame 1 and are secured thereto by set screws 10.

Cast with and below the said Y portion 6 is the centrally grooved supporting member 11 grooved at 12 and forming the supporting member of the hoe arm 13 the hoe 4 being fitted with a cultivator share or tooth 14 at its lower end and receiving the conduits from the seed and fertilizer box in the usual way.

These hoe arms 13 extend horizontally forwardly and then downwardly as at 15 a short distance and immediately near the forward top edge the hoe is formed on either side with studs 16 which are received and held in holes 18 partially formed in the member 11 and partially formed in the mating piece or block 17 so as to provide a pivot at that point.

This construction allows for the free movement to the hoe 4 and its arm 13 in the stump jumping operation.

The grooving of the hoe supporting member as at 12 on the underside also forms a guide for the hoe arm 13 the forward and bent end 15 of which at the lower end pivotally connects at 20 a link 21 which extends slightly diagonally to approximately the centre and is pivoted at 22 in a recess 23 of a diagonally disposed arm 24 the upper end of which is notched at 25 to receive the chains 26 from the draft appliances.

This contruction is thus characterized in that the draft connection at 25 is above the float frame thus forming a further essential characteristic embodied in the invention.

The link 21 where it connects the draft connecting arm 24 preferably passes between the parallel sides 3 of the respective honeycomb sections 2.

The lower end of the draft connecting arm 24 is formed with projecting studs 27 on both sides which enter holes 28 in two detachable supporting plates 29. These detachable supporting plates 29 are stepped at 30 so as to receive the studs 27 of the arm 24 at the lower end and form a pivot point and at their upper ends are secured by set screws 31 to the outside of the parallel sides 3 of the honeycomb sections 2.

From the draft connecting arm 24 chains 26 or other flexible connections extend to and around horizontally disposed rollers 32 fitted to the draft swingle trees, the chain or flexible connection extending rearwardly from the roller above the float frame to the draft arm 24 of the hoe next in horizontal line, thus each flexible draft connection engages two stump jump arms 24 except the connections engaging each end of the swingle tree.

As illustrated in Figure 8 the supporting bracket 6, 11 may be formed in two halves centrally divided at 33.

In the modification illustrated in Figure 9 the frame may be rectangular in shape being formed of four transversely spaced angle beams 34 with a front beam 35 and side bars 36.

The hoe and jump supports are mounted between and to spaced bars 37 arranged in pairs between each pair of beams 34 and provided with angle ends 38 by means of which they are bolted to the beams 34.

The hoes 39 are provided with forwardly extending arms 13 formed with a downwardly extending member 41.

Each hoe arm 13 is pivoted at 42 between depending lugs 43 of a bracket 44 in the shape of an inverted T provided with a vertical member 45 by means of which it is bolted to one of the angle beams 34.

The lugs 43 form a guide for the hoe arm 40 and to the lower end of the hoe arm extension 41 is pivoted a link 21 in the manner described.

Figure 14:
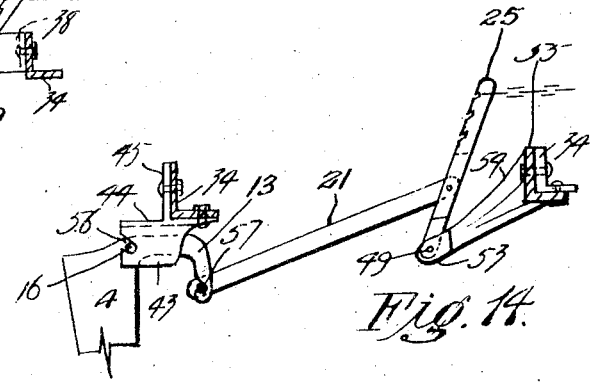
Figure 14 is a view in side elevation partly in section of a further modification of stump jump mechanism.

If desired and as illustrated in Figure 14 the bars 37 may be dispensed with, the lower end of the draft arm 25 being pivoted at 49 between lugs 53 extending from a bracket 54 formed with an angle member 55 by means of which the said bracket is bolted to its beam 34.

The lugs 43 of the bracket 44 may be formed with a diagonal slot 56 to allow the studs 16 of the hoe arm 40 to detachably seat therein and at the same time form the pivot point for the hoe, while the lower end of the extension 41 of the hoe arm may also be formed with a diagonal slot 57 so as to allow of the pivoting as well as the ready detaching of the link 46 therefrom.

What I claim as my invention and desire to secure by Letters Patent is:—

Apparatus of the class described, comprising, a frame formed of connected, matching polygonally shaped, members, each member having certain of its sides independent from and parallel with the sides of adjacent members, and spaced therefrom, the spaced parallel sides being positioned in staggered relation, a hoe mounted adjacent each pair of parallel sides, and hoe stump jump mechanism mounted between each pair of parallel sides operatively connected with the hoe.

Signed at Melbourne, Victoria, Australia, this 13th day of January 1922.

JOHANN HEINRICH REICHELT.

In the presence of—
  SIDNEY HENDLEY,
  JEANNE BOUSLIERE.